(12) United States Patent
Ichikawa et al.

(10) Patent No.: US 9,755,410 B2
(45) Date of Patent: Sep. 5, 2017

(54) WIRE HARNESS

(75) Inventors: Hidehiro Ichikawa, Kosai (JP);
Tatsuya Oga, Kosai (JP); Takeshi Ogue, Kosai (JP)

(73) Assignee: Yazaki Corporation, Tokyo (JP)

( * ) Notice: Subject to any disclaimer, the term of this patent is extended or adjusted under 35 U.S.C. 154(b) by 170 days.

(21) Appl. No.: 12/737,646

(22) PCT Filed: Aug. 11, 2009

(86) PCT No.: PCT/JP2009/064169
§ 371 (c)(1),
(2), (4) Date: Feb. 2, 2011

(87) PCT Pub. No.: WO2010/021271
PCT Pub. Date: Feb. 25, 2010

(65) Prior Publication Data
US 2011/0127084 A1  Jun. 2, 2011

(30) Foreign Application Priority Data
Aug. 19, 2008  (JP) .................................. 2008-210252

(51) Int. Cl.
*H02G 3/04* (2006.01)
*B60R 16/02* (2006.01)

(52) U.S. Cl.
CPC ....... *H02G 3/0468* (2013.01); *B60R 16/0215* (2013.01)

(58) Field of Classification Search
CPC .......................... H02G 3/0468; B60R 16/0215
(Continued)

(56) References Cited

U.S. PATENT DOCUMENTS 6,051,789 A * 4/2000 Kato ........................... 174/68.3
2001/0004022 A1 * 6/2001 Kobayashi .......... B60R 16/0207
174/72 A
(Continued)

FOREIGN PATENT DOCUMENTS

CN  1193836 A  9/1998
CN  101186788 A  5/2008
(Continued)

OTHER PUBLICATIONS

International Search Report dated Oct. 6, 2009, issued for PCT/JP2009/064169.
(Continued)

*Primary Examiner* — Timothy Thompson
*Assistant Examiner* — Rhadames J Alonzo Miller
(74) *Attorney, Agent, or Firm* — Locke Lord LLP

(57) ABSTRACT

[Problem] To provide a wire harness allowing a relatively large number of electrical wires to be passed under the floor of a vehicle body.
[Means for Solving Problem]
A wire harness 21 is provided with a plurality of high-voltage electrical wires 22, a protection member 23 which protects the high-voltage electrical wires 22, fixed members 24, 25 which fix the wire harness in a vehicle, and a low-voltage electrical wire 26. The protection member 23 has two protection members for body under floor 29 and a body under floor protection member 30. The protection members thereof are flat-corrugated tubes. In the two protection members for body under floor protection member 29, circuits 22a, 22b which have the plurality of high-voltage electrical wires 22 are respectively received. Also, in the protection member 30 for body under floor, a circuit 26a
(Continued)

which has the low-voltage electrical wire 26 is received. The two protection members 29 and the protection member 30 are arranged side by side.

4 Claims, 4 Drawing Sheets

(58) Field of Classification Search
    USPC ....................................................... 174/72 A
    See application file for complete search history.

(56) References Cited

U.S. PATENT DOCUMENTS

| | | | |
|---|---|---|---|
| 2005/0162015 A1 | 7/2005 | Yamaguchi et al. | |
| 2009/0256420 A1 | 10/2009 | Takehara et al. | |

FOREIGN PATENT DOCUMENTS

| | | | | |
|---|---|---|---|---|
| DE | 4230636 | A1 | | 3/1994 |
| DE | 19817109 | A1 | | 10/1999 |
| JP | S57-1744 | U | | 1/1982 |
| JP | S59-121575 | U | | 8/1984 |
| JP | 10-257634 | A | | 9/1998 |
| JP | H11-8922 | A | | 1/1999 |
| JP | 2000-353438 | A | | 12/2000 |
| JP | 2002-225648 | A | | 8/2002 |
| JP | 2002225648 | A | * | 8/2002 |
| JP | 2003100155 | A | | 4/2003 |
| JP | 2004-224156 | A | | 8/2004 |
| JP | 2004-268803 | A | | 9/2004 |
| JP | 2004268803 | A | * | 9/2004 |
| JP | 2006-311700 | A | | 11/2006 |
| JP | 2006311700 | A | * | 11/2006 |
| JP | 2007-066825 | A | | 3/2007 |
| JP | 2007-306732 | A | | 11/2007 |
| JP | 2007-307984 | A | | 11/2007 |

OTHER PUBLICATIONS

Chinese Office Action dated Aug. 31, 2012 issued for Chinese Application No. 200980132057.4, with English translation.
Office Action dated Mar. 9, 2016 issued for corresponding European Patent Application No. 09808207.6.
Office Action dated Sep. 26, 2012 issued for corresponding Japanese Patent Application No. 2008-210252.
Office Action dated Jul. 10, 2014 issued for corresponding Japanese Patent Application No. 2013-138568.
Office Action dated Nov. 14, 2014 issued for corresponding Japanese Patent Application No. 2013-138568.
Office Action dated Feb. 5, 2015 issued for corresponding Japanese Patent Application No. 2013-138568.
Office Action dated Jul. 10, 2014 issued for corresponding Japanese Patent Application No. 2013-138569.
Office Action dated Nov. 14, 2014 issued for corresponding Japanese Patent Application No. 2013-138569.
Office Action dated Feb. 5, 2015 issued for corresponding Japanese Patent Application No. 2013-138569.

* cited by examiner

WIRE HARNESS

TECHNICAL FIELD

The present invention relates to a wire harness arranged through a body under floor which is outside of a body frame. More specifically, there is provided the wire harness having a plurality of high-voltage electrical wires and a protection member protecting thereto.

BACK GROUND ART

A wire harness described in the following patent document 1 includes three high-voltage electrical wires and three metallic protection pipes and consists of them. Each metallic protection pipe receives and protects each high-voltage electrical wire. The high-voltage electrical wire is provided as connecting a motor mounted on a front side of vehicle to an inverter mounted on a middle side or back side of the vehicle.

The wire harness is mounted through the body under floor which is an outside of a body frame. For this reason, the metallic protection pipe is formed as so to protect the high-voltage electrical wire from splash of stone or water. The metallic protection pipe has stiffness for protecting the high-voltage electrical wire from splash of stone or water and for preventing flexible of the high-voltage electrical wire. Moreover, the metallic protection pipe has electromagnetic shield function because it is made from metal.

The wire harness is made by inserting the high-voltage electrical wire into the metallic protection pipe of straight condition three times and by bending the metallic protection pipe along arrangement route of the wire harness in the body under floor. After the wire harness is produced as mentioned above in a manufacturer factory of harness, the wire harness is transferred to an assembly factory of vehicle and assembled into predefined position of a vehicle. Thereby, arrangement of the wire harness is finished.

In addition, when the wire harness is conveyed, it is required that enough space is maintained in each wire harness because the wire harness is deformed by touching each other. Further, since the metallic protection pipe is produced by three-dimensionally bent work three-dimensionally, stereoscopic space is required. As a problem of these spaces securing, in order to resolve this problem, it is known that a wire harness disclosed in the patent document 2 is suitable.

The wire harness disclosed in following patent document 2 has three high-voltage electrical wires and a metallic protection pipe which receives the three high-voltage electrical wires in a one lump and protects. The high-voltage electrical wire is provided so as to connect equipment such as an inverter, a battery, a motor and so on. The metallic protection pipe is a pipe member which is made from metal and formed into a round shape in cross section. In the outer circumference and the inner circumference thereof, a spiral protrusion and recess are formed at a regular interval. That is, the metallic protection pipe is processed into waveform of configuration which radial is alternately increased and decreased along this axis direction. The processing of waveform is almost formed over the entire length of the metallic protection pipe (a mounting member is provided in both end portions of the metallic portion, and the processing of wave form is formed except the end portions). The metallic protection pipe has electromagnetic shield function by making it to metallic.

According to following patent document 2, when the metallic protection pipe is bent and transformed, waveform pitch in the bent inner side thereof narrows and waveform pitch in the outer side widens. By transforming, pipe wall thickness extremely changes and therefore is formed so as not to damage. The metallic protection pipe is freely bent by the hand work keeping cylindrical of this diameter and can be transformed. Also, the metallic protection pipe has a prescribed rigidity and the shape after bent can be kept.

Such three high-voltage electrical wires, which is collected in one lump and received in the metallic protection pipe, is received with trefoil formation (a triangular shape when a center of the electrical wire is connected) in the metallic protection pipe. The high-voltage electrical wire which is formed with the trefoil formation is located at the center of the metallic protection pipe, and placed away from inner surface of the pipe to only prescribed distance.

The wire harness described in following patent document 2 can freely bend and deform the metallic protection pipe by hand work. Thereby, when the wire harness is transferred from a harness manufacturer factory to an assembly factory of vehicle manufacturer, it is possible to put the metallic protection pipe into almost straight state and folded state. That is, space can be maintained easier than wire harness disclosed in the patent document 1.

The wire harness disclosed in the patent document 2 is assembled by bending or extending along arrangement route in a vehicle after it is transferred to the assembly factory of vehicle manufacturer.

PRIOR ART DOCUMENT

Patent Document

Patent document 1: Japanese patent publication number 2004-224156

Patent document 2: Japanese patent publication number 2007-66825

DISCLOSURE OF THE INVENTION

Problem to be Solved by the Invention

By the way, in the wire harness disclosed in the patent document 2, the number of the high-voltage electrical wire included therein is three. For this reason, even if the wire harness is arranged in a body under floor, height thereof doesn't rise up to height where trouble is caused. However, when there is a request that it wants to increase number of electrical wires, the wire harness have to change a metallic protection pipe of big diameter. As a result, high wire harness in height is arranged in the body under floor. So, the wire harness is provided close to the ground. Therefore, in this case, it, is doubtful whether enough protection can be done.

An object of the present invention is to provide a wire harness which can pass comparatively a lot of electrical wires through a body under floor.

Problem to be Solved by the Invention

According to the invention described in claim 1, a wire harness assembled through a body under floor which is outside of a body frame has a plurality of electrical wires, wherein a portion assembled in the body under floor is formed by dividing the plurality of the electrical wires into a plurality of circuits, by receiving each circuit in a corresponding plastic flat-corrugated tube, and by arranging the each flat-corrugated tube.

According to the present invention described in claim 2, in the wire harness described in claim 1, a predetermined space is formed in the adjacent flat-corrugated tube.

According to the wire harness of the present invention described in claim 3, in the wire harness described in claim 1 or 2, the circuit is divided depending on electrical wire type.

According to the wire harness of the present invention described in claim 4, in the wire harness described in claim 1, 2, or 3, a corrugated tube, which is formed at the same height as the flat-corrugated tube or with height lower than thereof and is formed into a cross-section round shape, is combined with the flat-corrugated tube.

In the present invention having the above-mentioned feature, as an example of flat-corrugated tube, a cross-section thereof is formed into a noncircular shape which is an elliptical shape etc, insulation performance is included. Also, the flat-corrugated tube is formed with an accordion-shaped like a protrusion portion and a recess portion are alternately continued along an axis direction of the corrugated tube. Also, there is the flat-corrugated tube which is formed into a seamless shape without slit along the tube axis. In addition, there is an example of the flat-corrugated tube which is formed into a shape having internal space in accordance with state with which the electrical wire including the circuit is arranged in line. In the present invention, a corrugated tube, which is formed at the same height as the flat-corrugated tube or with height lower than thereof and is formed into a cross-section round shape, can be combined with the flat-corrugated tube.

Effect of the Invention

According to the invention described in claim 1, even if there are relatively a lot of numbers of electrical wires, the wire harness of low height can be assembled in a body under floor. Therefore, it is possible to protect the electrical wires without any difficulty. The wire harness of the present invention is easily bent, and easy to care for. Furthermore, manufacturing is good.

According to the invention described in claim 2, further, the wire harness is able to be easily bent.

According to the invention described in claim 3, since the electrical wire type is simple to understand, manufacturing can be improved. Moreover, work efficiency of mounting of the wire harness can be improved.

According to the invention described in claim 4, it is possible to increase manufacturing.

DESCRIPTION OF EMBODIMENTS

Figure 1:
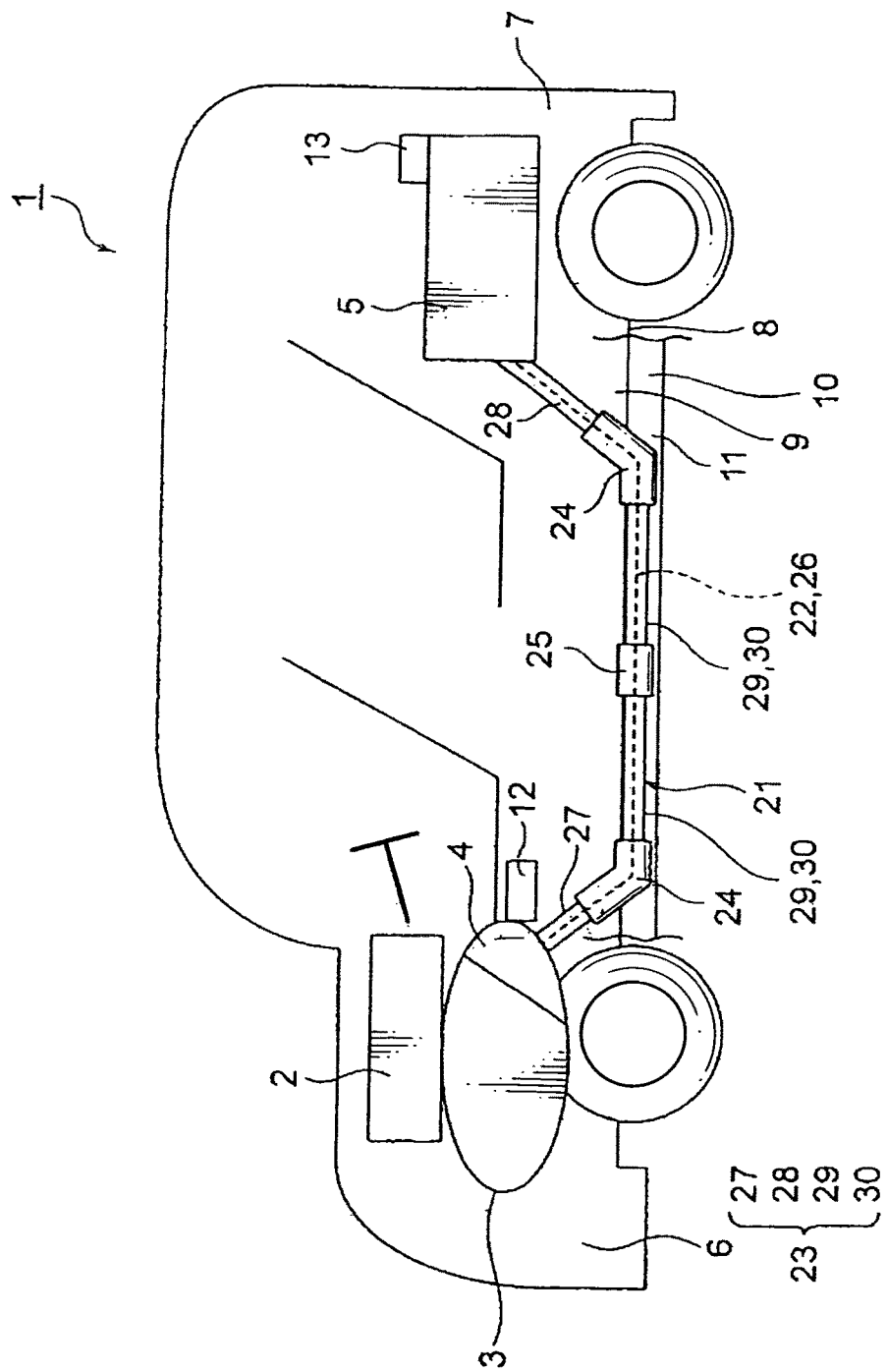
FIG. 1 An exemplary configuration view showing an embodiment of a wire harness according to the present invention.
Figure 2:
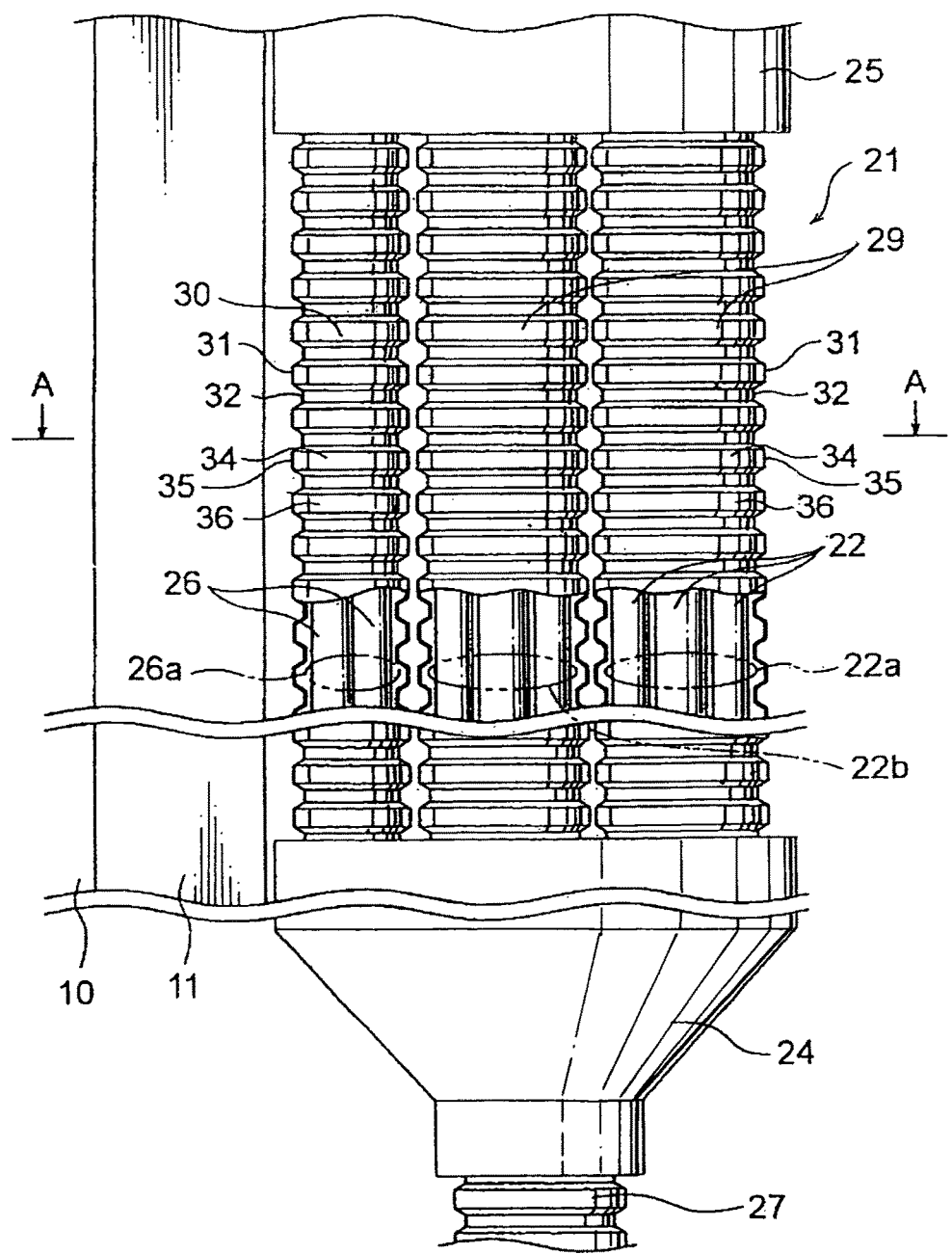
FIG. 2 An essential enlarged view when seeing the body under floor from the ground.
Figure 3:
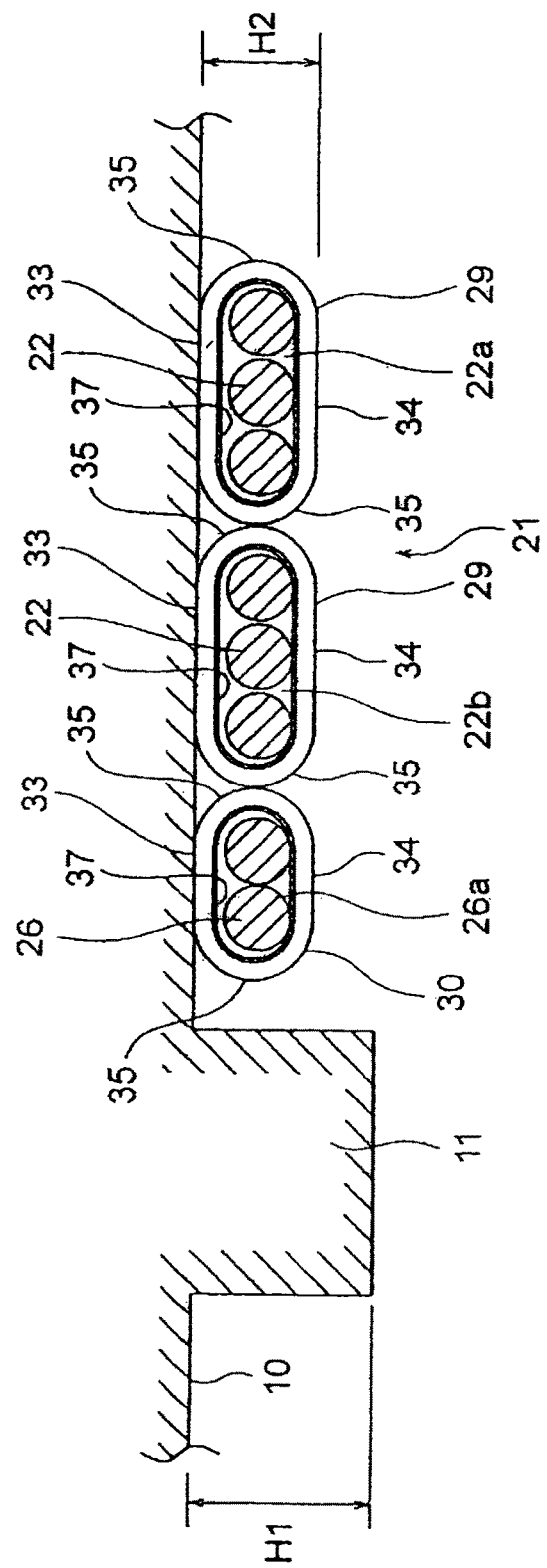
FIG. 3 A cross-sectional view taken along the line A-A in FIG. 2.

Hereinafter, the present invention will be explained with reference to FIGS. FIG. 1 is an exemplary configuration view showing an embodiment of a wire harness of the present invention. Further, FIG. 2 is a main enlarged view when seeing the body under floor from the ground, and FIG. 3 is a cross-sectional view taken along the line A-A in FIG. 2.

The wire harness of an embodiment in the present invention is designed for object mounted on a hybrid vehicle or an electrical vehicle. In what follows, an example of Plug-in hybrid vehicle (PHEV) is described (even for electrical vehicle, constitution of the wire harness, configuration thereof, and effect thereof are basically the same).

In FIG. 1, reference sign 1 shows a plug-in hybrid vehicle. The plug-in hybrid vehicle 1 is a vehicle which is powered by mixing two power of an engine 2 and a motor 3. In the motor 3, electrical power from a battery 5 through an inverter 4 is supplied. The engine 2, the motor 3 and the inverter 4, in the embodiment, is mounted on a front side of the vehicle interior 6 having front wheels etc. In addition, the battery 5 is mounted on a back side of the vehicle interior having back wheels etc.

Reference sign 8 shows a body frame. In FIGS, an upper side of the body frame 8 shows a body floor 9. Also, a bottom side of the body frame 8 shows a body under floor 10. In the body under floor 10, a lean hose 11 is provided. The lean hose 11 is made with protrusion shape so as to increase the strength of the vehicle in cross-section. The lean hose 11 stretches back and forth in the vehicle, and is formed. Reference sing 12 in the front side of the vehicle interior 6 shows an electrical connection box such as a well-known relay box. Further, reference sign 13 in the back side of the vehicle interior 7 shows a well-known low-pressure battery (position of the low-pressure battery 13 is one example).

In the embodiment, the motor 3 includes a motor and a generator and consists thereof. Also, the inverter 4 includes an inverter and a converter and consists thereof. The inverter 4 is an inverter assembly, in the above inverter, for example air conditioner inverter, inverter for generator and inverter for motor are included. The battery 5 is Ni—NH (Nickel metal hydride) battery or Li-ion (lithium-ion) battery. For example, the battery 5 is compositions that can be charged form an external outlet such as domestic power supplies. The battery 5 is modularized by combining various functional components.

Between the inverter 4 and the battery 5 is connected by a wire harness 21 of the present invention.

The wire harness 21 of the present invention has a plurality of high-voltage electrical wires 22, a protection member 23, and fixed members 24, 25 for fixing a vehicle. The high-voltage electrical wire is electrically connected between the inverter 4 and the battery 5. The protection member 23 protects the plurality of the high-voltage electrical wire 22. Further, specifically not limited, in the embodiment, the wire harness 21 has a plurality of public low-voltage electrical wires 26 (In the embodiment, a low-voltage electrical wire 26 is provided so as to arrange a low-voltage battery 13 in the back side of the vehicle interior 7. in the embodiment, the wire harness 21 is modularized). The wire harness 21 is extended and formed from the front side 6 of the vehicle interior to the back side 7 of the vehicle interior through the body under floor 10. The wire harness 21 passes through the body frame 8. Hereinafter, the above configuration in the wire harness 21 is described.

The above high-voltage electrical wire 22 is well-known power cable, and a circular shape which becomes at a prescribed diameter is used in cross-section. A conductor, which is located in the center of the high-voltage electrical wire 22, is made of copper, copper alloy or aluminum. The six high-voltage electrical wires 22 (multiply 3 by 2) are provided in the embodiment. In terminal of the high-voltage electrical wire, connector (not shown) having terminal for connecting equipment is provided. Besides, the high-voltage electrical wire 22 may have shield function including braided wire and so on (regarding to the shield function, braided wire which covers the plurality of high-voltage electrical wires 22 in one lump may be provided). The above six high-voltage electrical wires 22 are divided in two circuits 22a, 22b (shown in FIG. 2).

The above described low-voltage electrical wire 26 is protected by the protection member 23 with the high-voltage electrical wire 22. One end of the low-voltage electrical wire 26 is connected to the above electric connection wire 12, the other end thereof is connected to the low-voltage battery 13. In the embodiment, the two low-voltage electrical wires 26 are provided.

The protection member 23 which protects the plurality of high-voltage electrical wires 22 and the plurality of low-voltage electrical wires 26 is provided with each part of different types. For more detail, the protection member 23 has protection members for vehicle interior 27, 28, two protection members for body under floor 29, and a body under floor protection member 30 and is provided therewith. In addition, function of the protection member 23, that is to say function for protect the plurality of high-voltage electrical wires 22 and low-voltage electrical wires 26, has the above fixed member 24 in the embodiment.

The vehicle interior protection member 27, 28 is located at the vehicle interior in the body floor 9 side, and constructed of plastics material having insulation performance. Further, well-known round-corrugated tube which cross-section is a round shape is used here (A protector may be used. Also, a combination of the round-corrugated tube and the protector may be used. If the protection members for vehicle interior 27, 28 can protect the high-voltage electrical wires 22 in the vehicle interior, configuration of the protection members for vehicle interior 27, 28 are especially not limited). The vehicle interior protection member 27 is arranged in the vehicle interior front side 6. Furthermore, the vehicle interior protection member 28 is arranged in the vehicle interior back side 7.

In FIG. 1 to FIG. 3, the above body under floor protection members 29, 30 is a plastic flat-tube having insulation performance formed into noncircular-shaped (herein, oval shaped). The body under floor protection members 29, 30 are formed with an accordion-shaped such as a protrusion portion 31 and a recess portion 32 are alternately continued along a circumferential direction of independent member (further, it may be possible to change the body under floor protection member 30 to a well-known round corrugated tube, which cross-section shape thereof is a round shape). However, it is desirable to use a shape of the same height as the body under floor protection member 29 corresponding to the flat-corrugated tube or lower than height of the body under floor protection member 29

In the two protection members for body under floor 29, circuits 22a, 22b composed of a plurality of the high-voltage electrical wires 22 is received. Also, in the body under floor protection member 30, circuit 26a composed of the low-voltage electrical wire 26 is received. Two body under floor protection members 29 and the body under floor protection member 30 are located so that adjacent protection members each other is arranged with minimum space (It is not limited. Another example is described in FIG. 4). In the embodiment, the body under floor protection member 30 is located next to the lean hose 11, but the location is not limited.

Referring now to FIG. 2 and FIG. 3, shapes of the body under floor protection members 29, 30 are explained in a little more detail. The body under floor protection members 29, 30 has a pair of opposed flat surfaces and a pair of curved surfaces, and is formed (cross-section shape is elliptic shape. Also, the cross-section shape of elliptic shape is one example). In particular, a under floor placing surface 33, a ground opposite surface 34 and a pair of curved surfaces 35 is provided, a elliptical shape is formed in cross-section. In a protrusion portion 31, a top surface 36 including the under floor placing surface 33, the ground opposite surface 34 and the curved surface 35 is formed.

The body under floor protection members 29, 30 are formed so that a height H2 is lower than a height H1 (high H1 from body under floor 10 to a top surface of the lean hose 11) of the lean hose 11. That is, the protection members for body under floor 29, 30 are formed lower than the lean hose 11.

In the body under floor protection members 29, 30, internal space 37 is formed with a state which the high-voltage electrical wire 22 and the low-voltage electrical wire 26 are arranged in line. Further, the protection members for body under floor 29, 30 are formed into a seamless shape without slit along a direction of the tube axis. The high-voltage electrical wire 22 and the low-voltage electrical wire 26 is inserted from one opening of the body under floor protection members 29, 30 to the other opening thereof. Thereby, the protection members for body under floor 29, 30 are received.

In FIG. 1 and FIG. 2, the above fixed members 24, 25 are one type of various types in order to fix the wire harness 21 in the vehicle. Here, for example, a plastic protector having screw clamp portion against the body frame 8 is shown as one example. The fixed members 24, 25 are another component against the protection member 23, and are formed so as to be able to hold the protection members for body under floor 29, with a state along the body under floor 10 here. In addition, position and number of the fixed members 24, 25 are one example. The fixed member 24 is formed as a member connecting the protection members for vehicle interior to the protection members for body under floor 29, 30 (there are one example). On the other hand, the fixed member 25 is formed as a member mounted between the body under floor protection member 29 and the body under floor protection member 30.

In the above-mentioned composition and the structure, the fixed members 24, 25 are mounted in a predetermined position of the protection member 23 including the protection members for vehicle interior 27, 28 and protection members for body under floor 29, 30. Then, the plurality of high-voltage electrical wires 22 and low-voltage electrical wires 26 are inserted into the protection member 23. Further, when each terminal of the high-voltage electrical wires 22 and the low-voltage electrical wires 26 which are exposed from the protection members for vehicle interior 27, 28 is processed (connector or terminal is provided), production of the wire harness 21 in the present invention is finished. In the produced wire harness 21, the protection member 23 has flexibility and so on. For this season, for example the produced wire harness 21 are conveyed with a rolled state. And then, in car manufactures, assembling is finished by mounting the wire harness 21 on a predetermined position of vehicle.

Therefore, according to the present invention, even if there are relatively a lot of numbers of electrical wires (while conventional electrical wire is three, electrical wire is eight in the embodiment), the wire harness 21 of low height can be assembled in the body under floor 10. The wire harness 21 of the present invention, as will be appreciated from the above composition and the structure, can be easily bent, and easy to care for. Furthermore, manufacturing is also good.

Figure 4:
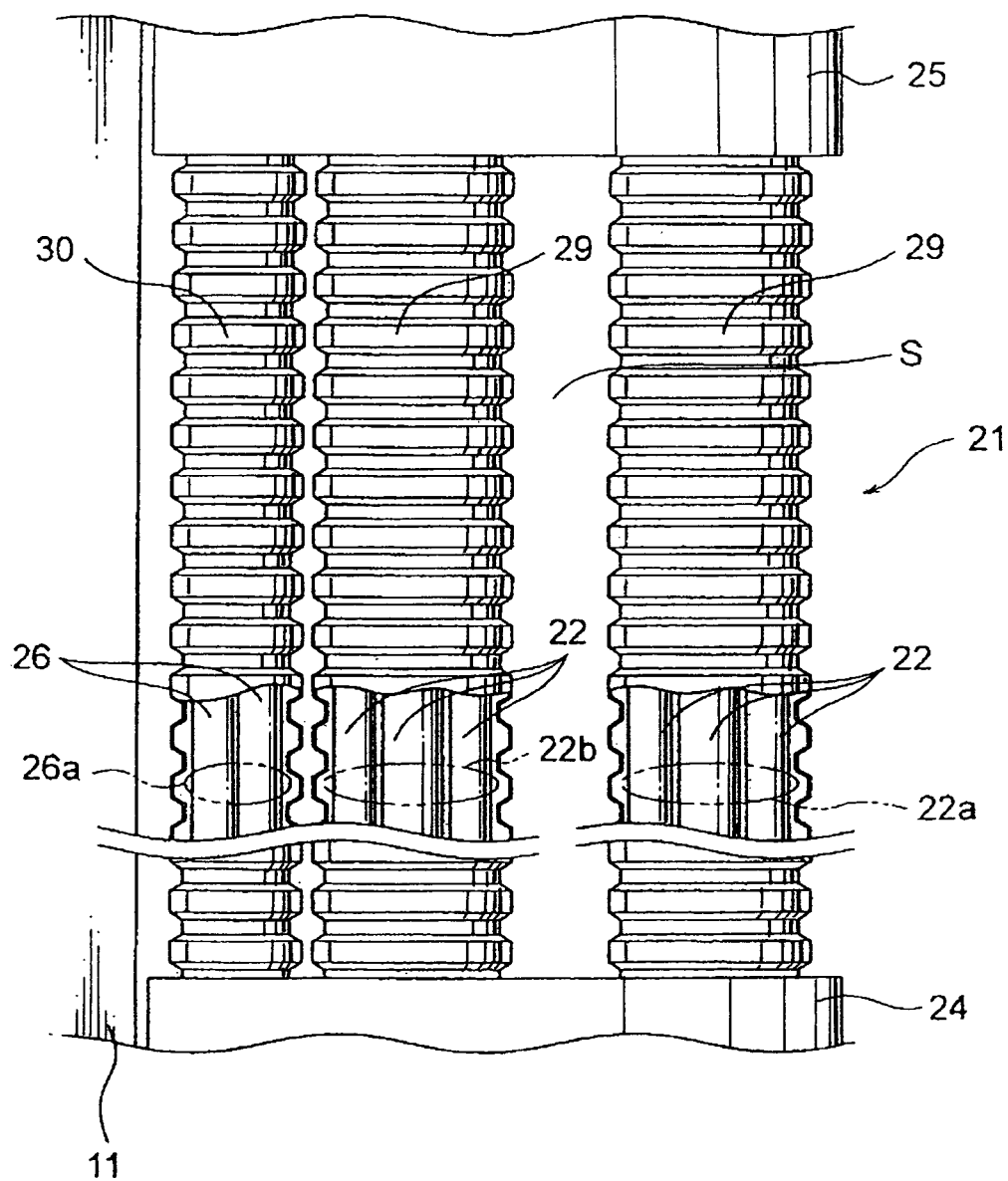
FIG. 4 A view showing another example of the wire harness (An essential enlarged view when seeing the body under floor form the ground).

Additionally, in the wire harness 21, as shown in FIG. 4, by having a prescribed space S between the adjacent protection members for body under floor 29 (flat-corrugated tube), it is possible to be easily bent (one such example).

For example, as shown in FIG. 2, the protection members for body under floor 29, 30 may be arranged at space between the fixed members 24, 25 in front side. In addition, as shown in FIG. 4, the protection members for body under floor 29, 30 may be arranged at space between the fixed members 24, 25 in back side (including the prescribed space S).

The above circuits 22a, 22b received in the body under floor protection member 29 is divided depending on the electrical wire type. In the embodiment, for example, conductor is divided with copper and aluminum (this is an example. In addition, it may divide by the positive and the negative and by each connecting target).

While the present invention is described in the embodiment, it is not limited thereto. Various change and modifications can be made with the scope of the present invention.

REFERENCE SINGS LIST 1 plug-in hybrid auto vehicle
2 engine
3 motor
4 inverter
5 battery
6 vehicle interior front side
7 vehicle interior back side
8 body frame
9 body floor
10 body under floor
11 lean hose
12 electric connection box
13 low-pressure battery
21 wire harness
22 high-voltage electrical wire (electrical wire)
22a, 22b circuit
23 protection member
24, 25 fixed member
26 low-voltage electrical wire (electrical wire)
26a circuit
27, 28 vehicle interior protection member
29, 30 body under floor protection member (flat corrugated tube)
31 protrusion portion
32 recess portion
33 under floor placing surface
34 ground opposite surface
35 curved surface
36 top surface
37 internal space

The invention claimed is:

1. A wire harness to be mounted on a vehicle, comprising;
a plurality of electrical wires; and
a plurality of plastic flat-corrugated tubes to be located at a body under floor which is outside of a body frame,
wherein the plurality of the electrical wires are configured to be at least grouped into a first group of wires consisting of high-voltage electrical wires and a second group of wires consisting of low-voltage electrical wires at the body under floor, and separately received in the groups of two or more wires in the corresponding plastic flat-corrugated tubes,
wherein each first and second group of wires includes two or more wires,
wherein the wire harness further includes
a plurality of plastic round-corrugated tubes to be located in a vehicle interior, the entire round-corrugated tube located in the vehicle interior,
a plurality of first fixed members each connecting the flat-corrugated tubes entering one side of the first fixed member with the round-corrugated tube entering an opposite side of the first fixed member, and
a second fixed member provided to the plurality of flat-corrugated tubes to fix the plurality of flat-corrugated tubes to the body under floor,
wherein the wire harness with the first fixed members and the second fixed member is configured to be conveyed in a rolled state, and
wherein the wire harness is configured such that, when the wire harness is mounted to the body under floor, the first and the second groups of wires are aligned in a horizontal direction so that any two wires do not overlap with each other in a vertical direction, and the plurality of flat-corrugated tubes are aligned in a horizontal direction so that any two flat-corrugated tubes do not overlap with each other in a vertical direction and a surface in a cross sectional and longitudinal direction of each of the flat-corrugated tubes opposes a back surface of the floor.

2. The wire harness described in claim 1, wherein a predetermined space is formed in the adjacent flat-corrugated tube.

3. The wire harness described in claim 1, wherein a corrugated tube, which is formed at the same height as the flat-corrugated tube or with height lower than thereof and is formed into a cross-section round shape, is combined with the flat-corrugated tube.

4. The wire harness described in claim 2, wherein a corrugated tube, which is formed at the same height as the flat-corrugated tube or with height lower than thereof and is formed into a cross-section round shape, is combined with the flat-corrugated tube.

* * * * *